(12) United States Patent
Agapiou et al.

(10) Patent No.: US 9,796,904 B2
(45) Date of Patent: Oct. 24, 2017

(54) USE OF MEMS IN SET-DELAYED CEMENT COMPOSITIONS COMPRISING PUMICE

(71) Applicant: Halliburton Energy Services, Inc., Houston, TX (US)

(72) Inventors: Kyriacos Agapiou, Houston, TX (US); Ronnie Glen Morgan, Waurika, OK (US); Thomas Jason Pisklak, Cypress, TX (US); Samuel Jason Lewis, Spring, TX (US); Lance Everett Brothers, Oklahoma City, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/634,766

(22) Filed: Feb. 28, 2015

(65) Prior Publication Data

US 2015/0175869 A1 Jun. 25, 2015

Related U.S. Application Data

(63) Continuation-in-part of application No. 14/478,869, filed on Sep. 5, 2014, which is a continuation of application No. 13/417,001, filed on Mar. 9, 2012, now Pat. No. 8,851,173.

(51) Int. Cl.
| | |
|---|---|
| *C04B 7/34* | (2006.01) |
| *C09K 8/46* | (2006.01) |
| *E21B 33/138* | (2006.01) |
| *C04B 28/18* | (2006.01) |
| *C04B 40/06* | (2006.01) |
| *C09K 8/467* | (2006.01) |

(52) U.S. Cl.
CPC ............. *C09K 8/46* (2013.01); *C04B 28/18* (2013.01); *C04B 40/0658* (2013.01); *C09K 8/467* (2013.01); *E21B 33/138* (2013.01)

(58) Field of Classification Search
CPC .................................. C04B 7/34; C04B 7/13
USPC .......................................................... 166/292
See application file for complete search history.

(56) References Cited

U.S. PATENT DOCUMENTS

| | | | |
|---|---|---|---|
| 3,238,279 | A | 3/1966 | Tarlton |
| 4,054,462 | A | 10/1977 | Stude |
| 4,349,443 | A | 9/1982 | Block |
| 4,350,533 | A | 9/1982 | Galer et al. |
| 4,875,937 | A | 10/1989 | Viles |
| 5,314,022 | A | 5/1994 | Cowan et al. |
| 6,221,148 | B1 | 4/2001 | Mathur |

(Continued)

FOREIGN PATENT DOCUMENTS

WO 2015034477 3/2015

OTHER PUBLICATIONS

Final Official Action for U.S. Appl. No. 14/098,198 dated Jun. 19, 2015.

(Continued)

*Primary Examiner* — Doug Hutton, Jr.
*Assistant Examiner* — Ashish Varma
(74) *Attorney, Agent, or Firm* — Craig W. Roddy; Tumey L.L.P.

(57) ABSTRACT

Disclosed is a method of cementing. The method comprises providing a set-delayed cement composition comprising water, pumice, hydrated lime, a set retarder, and a micro-electrical-mechanical system; and allowing the set-delayed cement composition to set.

21 Claims, 2 Drawing Sheets

(56) References Cited

U.S. PATENT DOCUMENTS

| | | |
|---|---|---|
| 6,333,005 B1 | 12/2001 | Nguyen |
| 7,244,303 B2 | 7/2007 | Chatterji et al. |
| 7,445,669 B2 | 11/2008 | Roddy et al. |
| 7,572,329 B2 | 8/2009 | Liu et al. |
| 8,048,219 B2 | 11/2011 | Woolfsmith |
| 9,255,031 B2 | 2/2016 | Pisklak |
| 9,260,343 B2 | 2/2016 | Brothers |
| 9,328,281 B2 | 5/2016 | Agapiou |
| 9,328,583 B2 | 5/2016 | Pisklak |
| 9,371,712 B2 | 6/2016 | Boul |
| 9,534,165 B2 | 1/2017 | Agapiou |
| 9,580,638 B2 | 2/2017 | Boul |
| 2003/0221778 A1 | 12/2003 | Musch et al. |
| 2005/0079016 A1 | 4/2005 | Greenwood et al. |
| 2006/0054320 A1 | 3/2006 | Brothers et al. |
| 2007/0089643 A1 | 4/2007 | Roddy et al. |
| 2007/0125534 A1 | 6/2007 | Reddy et al. |
| 2007/0284104 A1* | 12/2007 | Beckman ............ C04B 24/2623 166/293 |
| 2009/0105099 A1 | 4/2009 | Warrender |
| 2009/0124522 A1 | 5/2009 | Roddy |
| 2010/0044043 A1* | 2/2010 | Roddy ................ C04B 28/021 166/294 |
| 2010/0051275 A1* | 3/2010 | Lewis .................. C04B 28/02 166/286 |
| 2010/0258312 A1 | 10/2010 | Brenneis |
| 2010/0282466 A1 | 11/2010 | Brenneis et al. |
| 2010/0292365 A1 | 11/2010 | Roddy |
| 2011/0017452 A1 | 1/2011 | Benkley et al. |
| 2011/0272142 A1* | 11/2011 | Lewis .................. C04B 28/02 166/247 |
| 2011/0305830 A1 | 12/2011 | Frantz et al. |
| 2012/0214901 A1 | 8/2012 | Bury |
| 2012/0249552 A1 | 10/2012 | Harvill et al. |
| 2012/0251079 A1 | 10/2012 | Meschter et al. |
| 2012/0252304 A1 | 10/2012 | Vaughn |
| 2012/0291674 A1 | 11/2012 | Brenneis |
| 2014/0190696 A1 | 7/2014 | Iverson |
| 2015/0175481 A1 | 6/2015 | Pisklak |
| 2015/0175869 A1 | 6/2015 | Agapiou |
| 2015/0197033 A1 | 7/2015 | Agapiou |
| 2015/0197453 A1 | 7/2015 | Pisklak |

OTHER PUBLICATIONS

Official Action for U.S. Appl. No. 14/090,573 dated Jun. 12, 2015.
Final Official Action for U.S. Appl. No. 14/478,869 dated Jun. 17, 2015.
Official Action for U.S. Appl. No. 13/854,115 dated Jul. 15, 2015.
Final Official Action for U.S. Appl. No. 14/067,143 dated Aug. 12, 2015.
Official Action for U.S. Appl. No. 14/019,730 dated Jun. 3, 2015.
Official Action for U.S. Appl. No. 14/048,486 dated Aug. 17, 2015.
Official Action for U.S. Appl. No. 14/048,463 dated Sep. 9, 2015.
Official Action for U.S. Appl. No. 14/478,813 dated Sep. 10, 2015.
Final Official Action for U.S. Appl. No. 14/019,730 dated Sep. 23, 2015.
International Search Report and Written Opinion for PCT/US15/21837 dated Jun. 23, 2015.
AkzoNobel Colloidal Silica, "Perspectives on Colloidal Silica," https://www.aksonobel.com/colloidalsilica/silica_Facts/perpectives, Jul. 9, 2015.
ISRWO for PCT Application No. PCT/US2015/017564 dated Jun. 6, 2015.
ISRWO for PCT Application No. PCT/US2015/019709 dated May 22, 2015.
How Microsilica Improves Concrete, Publication #C850327. Copyright 1985, The Aberdeen Group.
Non-final Rejection for U.S. Appl. No. 15/087,961 dated Apr. 17, 2017.
Non-final Rejection for U.S. Appl. No. 15/162,245 dated Apr. 21, 2017.

* cited by examiner

USE OF MEMS IN SET-DELAYED CEMENT COMPOSITIONS COMPRISING PUMICE

CROSS-REFERENCE TO RELATED APPLICATIONS

The present application is a continuation-in-part of U.S. patent application Ser. No. 14/478,869, entitled "Set-Delayed Cement Compositions Comprising Pumice and Associated Methods," filed on Sep. 5, 2014, which is a continuation of U.S. patent application Ser. No. 13/417,001, entitled "Set-Delayed Cement Compositions Comprising Pumice and Associated Methods," filed on Mar. 9, 2012, the entire disclosures of which are incorporated herein by reference.

BACKGROUND

Embodiments relate to cementing operations and, in certain embodiments, to the use of micro-electro-mechanical systems ("MEMS") in set-delayed cement compositions.

Cement compositions may be used in a variety of operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for at least about one day (e.g., at least about 7 days, about 2 weeks, about 2 years or more) at room temperature (e.g., about 80° F.) in quiescent storage. When desired for use, the set-delayed cement compositions should be capable of being activated whereby reasonable compressive strengths are developed. For example, a cement set accelerator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions may benefit from an increase in compressive strength development. Specifically, boosts to early strength development as well as long term strength development would provide compositions capable of a being used in a broader variety of operations as compared to compositions that develop compressive strength slower or do not develop as much long term strength.

BRIEF DESCRIPTION OF THE DRAWINGS

These drawings illustrate certain aspects of some of the embodiments of the present method, and should not be used to limit or define the method.

DETAILED DESCRIPTION

Figure 1:
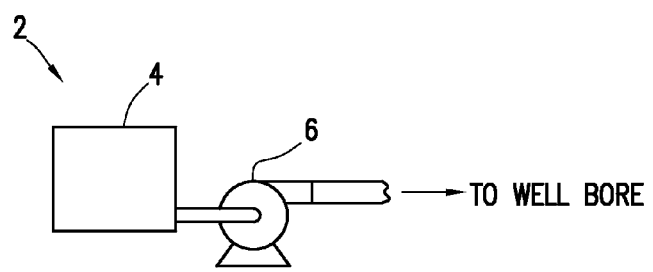
FIG. 1 illustrates a system for the preparation and delivery of a set-delayed cement composition to a wellbore in accordance with certain embodiments.

Embodiments relate to cementing operations and, in certain embodiments, to the use of micro-electro-mechanical systems ("MEMS") in set-delayed cement compositions. The set-delayed cement compositions comprising MEMS may include one or more sensors to provide information about the set-delayed cement composition as well as wellbore or environmental conditions.

MEMS devices are well known, e.g., a semiconductor device with mechanical features on the micrometer scale. MEMS embody the integration of mechanical elements, sensors, actuators, and electronics on a common substrate. The substrate may comprise silicon. MEMS elements may include mechanical elements which are movable by an input energy (electrical energy or other type of energy). Using MEMS, a sensor may be designed to emit a detectable signal based on a number of physical phenomena, including thermal, biological, optical, chemical, and magnetic effects or stimulation. MEMS devices are minute in size, have low power requirements, are relatively inexpensive and are rugged, and thus may be well suited for use in subterranean operations. The MEMS may contain passive sensors that do not require continuous power from a battery or an external source in order to transmit real-time data.

The MEMS may comprise an active material connected to (e.g., mounted within or mounted on the surface of) an enclosure, the active material being able to respond to a wellbore parameter, and the active material being operably connected to (e.g., in physical contact with, surrounding, or coating) a capacitive MEMS element. Suitable active materials, such as dielectric materials, that respond in a predictable and stable manner to changes in parameters over a long period may be identified according to methods well known in the art. The MEMS may sense one or more parameters within the wellbore or environment. Examples of the sensed parameters may include temperature, pH, moisture content, ion concentration (e.g., chloride, sodium, and/or potassium ions), or combinations thereof. The MEMS may also sense well cement characteristic data such as stress, strain, or combinations thereof. The MEMS may comprise active materials that respond to two or more measurands. In such a way, two or more parameters may be monitored.

The MEMS may be coupled with radio frequency identification devices (RFIDs) and may thus be able to detect and transmit parameters and/or well cement characteristic data for monitoring the cement during its service life. RFIDs may combine a microchip with an antenna (the RFID chip and the antenna are collectively referred to as the "transponder" or the "tag"). The antenna may provide the RFID chip with power when exposed to a narrow band, high frequency electromagnetic field from a transceiver. A dipole antenna or a coil, depending on the operating frequency, may be connected to the RFID chip and power the transponder when current is induced in the antenna by an RF signal from the transceiver's antenna. Such a device may be able to return a unique identification "ID" number by modulating and re-radiating the radio frequency (RF) wave. Passive RF tags are gaining widespread use due to their low cost, indefinite life, simplicity, efficiency, ability to identify parts at a distance without contact (tether-free information transmission ability). These robust and tiny tags may be attractive from an environmental standpoint as they require no battery. The MEMS and RFID tag may be integrated into a single component (e.g., chip or substrate), or may alternatively be separate components operably coupled to each other. In an embodiment, an integrated, passive MEMS/RFID may contain a data sensing component, an optional memory, and an RFID antenna, whereby excitation energy is received and powers up the sensor, thereby sensing a present condition and/or accessing one or more stored sensed conditions from memory and transmitting same via the RFID antenna.

Within the United States, commonly used operating bands for RFID systems center on one of the three government assigned frequencies: 125 kHz, 13.56 MHz or 2.45 GHz. A fourth frequency, 27.125 MHz, has also been assigned. When the 2.45 GHz carrier frequency is used, the range of an RFID chip can be many meters. While this is useful for remote sensing, there may be multiple transponders within the RF field. In order to prevent these devices from interacting and garbling the data, anti-collision schemes may be used, as are known in the art. The MEMS may be integrated with local tracking hardware to transmit their position as they flow within a cement composition. The MEMS may form a network using wireless links to neighboring data sensors and have location and positioning capability through, for example, local positioning algorithms as are known in the art. The MEMS may organize themselves into a network by listening to one another to better enable communication.

The MEMS may be ultra-small, e.g., 3 mm$^2$ or smaller, such that they may be pumpable in a cement composition. The MEMS may be approximately 0.01 mm$^2$ to 1 mm$^2$, alternatively 1 mm$^2$ to 3 mm$^2$, alternatively 3 mm$^2$ to 5 mm$^2$, or alternatively 5 mm$^2$ to 10 mm$^2$. Where MEMS may be used in cement compositions, the MEMS may be capable of providing data throughout the cement service life. The MEMS may be capable of providing data for up to 100 years. The set-delayed cement composition may comprise an amount of MEMS effective to measure one or more desired parameters. The set-delayed cement composition may comprise an effective amount of MEMS such that sensed readings may be obtained at intervals of about 1 foot, alternatively about 6 inches, or alternatively about 1 inch, along the portion of the wellbore containing the MEMS. Alternatively, the MEMS may be present in the cement composition in an amount of from about 0.01 to about 25 weight percent.

The MEMS may be mixed with the set-delayed cement composition by one of a variety of methods known to those of ordinary skill in the art. For example, the MEMS may be mixed with a dry material (e.g., dry blended with cement), mixed with one or more liquid components a carrier fluid such as water or a non-aqueous fluid), or combinations thereof. The mixing may occur onsite, for example, addition of the MEMS into a bulk mixer, such as a cement slurry mixer. The MEMS may be added directly to the bulk mixer, may be added to one or more component streams and subsequently fed to the bulk mixer, may be added downstream of the bulk mixer, or combinations thereof. In one specific example, the MEMS may be added after a blending unit and slurry pump, for example, through a lateral by-pass. The MEMS may be metered in and mixed onsite or may be pre-mixed into the set-delayed cement composition (or one or more components thereof) and subsequently transported to the well site. For example, the MEMS may be dry blended with the set-delayed cement composition and then transported to the well site. Alternatively or additionally, the MEMS may be pre-mixed with one or more liquid components mix water) and transported to a well site where a set-delayed cement composition may be formed comprising the MEMS. The properties of the set-delayed cement composition or components thereof may be such that the MEMS distributed or dispersed therein do not substantially settle during transport or placement.

Examples of the set-delayed cement compositions may generally comprise water, pumice, hydrated lime, a set retarder, and a MEMS. Optionally, the set-delayed cement compositions may further comprise a dispersant and/or a cement set activator. The set-delayed cement compositions may be foamed. Advantageously, the set-delayed cement compositions may be capable of remaining in a pumpable fluid state for an extended period of time. For example, the set-delayed cement compositions may remain in a pumpable fluid state for at least about 1 day, about 2 weeks, about 2 years, or longer. Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

The water may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain examples, the water may be present in the set-delayed cement composition in an amount in the range of from about 33% to about 200% by weight of the pumice. In certain examples, the water may be present in the set-delayed cement compositions in an amount in the range of from about 35% to about 70% by weight of the pumice. One of ordinary skill in the art with the benefit of this disclosure will recognize the appropriate amount of water for a chosen application.

Pumice may be present in the set-delayed cement compositions. Generally, pumice is a volcanic rock that can exhibit cementitious properties in that it may set and harden in the presence of hydrated lime and water. The pumice may also be ground. Generally, the pumice may have any particle size distribution as desired for a particular application. The pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific examples, the pumice may have a mean particle size in a range of from about 1 micron to about 200 microns, from about 5 microns to about 100 microns, or from about 10 microns to about 50 microns. In one particular example, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Hydrated lime may be present in the set-delayed cement compositions. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice. The hydrated lime may be present in an amount ranging between any of and/or including any of about 10%, about 20%, about 40%, about 60%, about 80%, or about 100% by weight of the pumice. In some examples, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

A set retarder maybe present in the set-delayed cement compositions. A broad variety of set retarders may be suitable for use in the set-delayed cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid copolymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the set-delayed cement compositions in an amount sufficient to delay the setting for a desired time. In some examples, the set retarder may be present in the set-delayed cement compositions in an amount in the range of from about 0.01% to about 10% by weight of the pumice. In specific examples, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used, polycarboxylated ether dispersants may be particularly suitable. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific examples, the dispersant may be present in an amount ranging between any of and/or including any of about 0.01%, about 0.1%, about 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

When desired for use, embodiments of the set-delayed cement compositions may be activated (e.g., by combination with an activator) to set into a hardened mass. The term "cement set activator" or "activator", as used herein, refers to an additive that activates a set-delayed or heavily retarded cement composition and may also accelerate the setting of the set-delayed, heavily retarded, or other cement composition. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days. "Hardened mass" as used herein denotes a composition that has reached a compressive strength of 50 psi.

One or more cement set activators may be added to the set-delayed cement compositions. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In a specific example, the activator may be provided and added to the set-delayed cement composition as a liquid additive, for example, a liquid additive comprising a monovalent salt, a polyphosphate, and optionally a dispersant.

Some embodiments may include a cement set activator comprising nanosilica. As used herein, the term "nanosilica" refers to silica having a particle size of less than or equal to about 100 nanometers ("nm"). The size of the nanosilica may be measured using any suitable technique. It should be understood that the measured size of the nanosilica may vary based on measurement technique, sample preparation, and sample conditions such as temperature, concentration, etc. One technique for measuring the particle size of the nanosilica is Transmission Electron Microscopy (TEM). An example of a commercially available product based on laser diffraction is the ZETASIZER Nano ZS particle size analyzer supplied by Malvern Instruments, Worcerstershire, UK. In some examples, the nanosilica may comprise colloidal nanosilica. The nanosilica may be stabilized using any suitable technique. In some examples, the nanosilica may be stabilized with a metal oxide, such as lithium oxide, sodium oxide, potassium oxide, and/or a combination thereof. Additionally the nanosilica may be stabilized with an amine and/or a metal oxide as mentioned above. Without limitation by theory, it is believed that the nanosilicas have an additional advantage in that they have been known to fill in pore space in cements which can result in superior mechanical properties in the cement after it has set.

Some examples may include a cement set activator comprising a combination of a monovalent salt and a polyphosphate. The monovalent salt and the polyphosphate may be combined prior to addition to the set-delayed cement composition or may be separately added to the set-delayed cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for the set-delayed cement compositions disclosed herein. The ratio of the monovalent salt to the polyphosphate may range, for example, from about 5:1 to about 1:25 or from about 1:1 to about 1:10. In some examples the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some examples, the combination of the monovalent salt and the polyphosphate may be mixed with a dispersant and water to form a liquid additive for activation of a set-delayed cement composition. Examples of suitable dispersants include, without limitation, the previously described dispersants, such as sulfonated-formaldehyde-based dispersants and polycarboxylated ether dispersants. One example of a suitable sulfonated-formaldehyde-based dispersant is a sulfonated acetone formaldehyde condensate, available from Halliburton Energy Services, Inc., as CFR-3™ dispersant. One example of a suitable polycarboxylated ether dispersant is Liquiment® 514L or 5581F dispersants, available from BASF Corporation, Houston, Tex.

The cement set activator may be added to the set-delayed cement composition in an amount sufficient to induce the set-delayed cement composition to set into a hardened mass. For example, the cement set activator may be added to the set-delayed cement composition in an amount in the range of about 0.1% to about 20% by weight of the pumice. In specific examples, the cement set activator may be present in an amount ranging between any of and/or including any of about 0.1%, about 1%, about 5%, about 10%, about 15%, or about 20% by weight of the pumice. One of ordinary skill in the art, with the benefit of this disclosure, will recognize the appropriate amount of cement set activator to include for a chosen application.

Other additives suitable for use in subterranean cementing operations also may be included in examples of the set-delayed cement compositions. Examples of such additives include, but are not limited to: lightweight additives, gas-generating additives, mechanical property enhancing additives, lost-circulation materials, defoaming agents, foaming agents, thixotropic additives, and combinations thereof. One or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Weighting agents may be included in the set-delayed cement compositions. Weighting agents are typically materials that weigh more than water and may be used to increase the density of the set-delayed cement compositions. By way of example, weighting agents may have a specific gravity of about 2 or higher (e.g., about 2, about 4, etc.). Examples of weighting agents that may be used include, but are not limited to, hematite, hausmannite, barite, and combinations thereof. Specific examples of suitable weighting agents include HI-DENSE® weighting agent, available from Halliburton Energy Services, Inc.

Lightweight additives may be included in the set-delayed cement compositions, for example, to decrease the density of the set-delayed cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art. The resin compositions may generally have lower base densities than the set-delayed cement compositions, thus hollow glass beads and/or foam may be suitable lightweight additives for the set-delayed cement compositions, dependent upon the base densities of the set-delayed cement compositions.

Gas-generating additives may be included in the set-delayed cement compositions to release gas at a predetermined time, which may be beneficial to prevent gas migration from the formation through the set-delayed cement compositions before they harden. The generated gas may combine with or inhibit the permeation of the set-delayed cement compositions by formation gas. Examples of suitable gas-generating additives include, but are not limited to, metal particles (e.g., aluminum powder) that react with an alkaline solution to generate a gas.

Lost-circulation materials may be included in the set-delayed cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Optionally, cement foaming additives may be included in the set-delayed cement compositions, for example, to facilitate foaming and/or stabilize the resultant foam formed therewith. The foaming additive may include a surfactant or combination of surfactants that reduce the surface tension of the water. As will be appreciated by those of ordinary skill in the art, the foaming additives may be used in conjunction with a gas to produce a foamed set-delayed cement compositions. By way of example, the foaming agent may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Inc.

Optionally, set accelerators for the set-delayed cement compositions may be included in the set-delayed cement compositions, for example, to increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof. For example, aluminum sulfate may be used to accelerate the setting time of the set-delayed cement compositions for surface uses which may require fast setting, for example, roadway repair, consumer uses, etc. The cement set accelerators may be added alongside any cement set activators when setting of the set-delayed cement compositions is desired. Alternatively, the set accelerators may be added before the cement set activator if desired, and if the set accelerator does not induce premature setting. Without being limited by theory, aluminum sulfate may promote the formation of sulfate containing species (e.g., ettringite) which may modify the rheology of the matrix during hydration such that textural uniformity and adherence to a surface is improved. Set accelerators may produce a set-delayed cement composition with a thickening time of less than 10 minutes, alternatively less than 5 minutes, alternatively, less than 1 minute, or further alternatively less than 30 seconds.

Optionally, mechanical-property-enhancing additives for set-delayed cement compositions may be included in the set-delayed cement compositions, for example, to ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, and combinations thereof.

Optionally, fluid-loss-control additives for cement may be included in the set-delayed cement compositions, for example, to decrease the volume of fluid that is lost. Properties of the set-delayed cement compositions may be significantly influenced by their water content. The loss of fluid can subject the set-delayed cement compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Optionally, cement defoaming additives may be included in the set-delayed cement compositions, for example, to reduce the tendency of the set-delayed cement compositions to foam during mixing and pumping of the set-delayed cement compositions. Examples of suitable defoaming additives include, but are not limited to, polyol silicone compounds. Suitable defoaming additives are available from Halliburton Energy Services, Inc., under the product name D-AIR™ defoamers.

Thixotropic additives may be included in the set-delayed cement compositions to, for example, provide a set-delayed cement composition that may be pumpable as a thin or low viscosity fluid, but when allowed to remain quiescent attains a relatively high viscosity. Among other things, thixotropic additives may be used to help control free water, create rapid gelation as the set-delayed cement composition sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Optionally, fibers may be included in the set-delayed cement compositions, for example, to enhance the tensile and ductile properties the set-delayed cement compositions. Examples of suitable defoaming additives include, but are not limited to, polyvinylalcohol, polypropylene, carbon, glass etc. Further, the fluidic nature and storage capabilities of the set-delayed cement composition allow for fibers which may, in other compositions, require high shear and high pressure pumping conditions for dispersion, to be dispersed using low. This is particularly advantageous in systems where the fibers may bridge and plug pumping equipment.

Optionally, refractory materials may be included in the set-delayed cement compositions, for example, to provide a set-delayed cement composition with higher heat resistance. Examples of suitable refractory materials include, but are not limited to, alumina, titanium, fire brick grog, etc. These refractory materials may be of particular importance in applications where fire and heat resistance is particularly important, for example, in consumer applications in the home.

In examples, the MEMS may be used for data gathering. The gathered data may be correlated with the determined position of the MEMS in the set-delayed cement composition. Data may be gathered continuously or intermittently after (and/or during) placement of the MES in the set-delayed cement composition. The data gathering may be carried out at the time of initial placement, for example, during cementing. Data gathering may also be carried out at one or more times subsequent to the initial placement of the MEMS into the wellbore. For example, data gathering may be carried out at the time of initial placement of the set-delayed cement composition or shortly thereafter to provide a baseline data set. As the wellbore is operated for recovery of natural resources over a period of time, data may be gathered at additional times. The data gathered over time may be compared to the baseline data and such comparison may indicate the overall condition of the wellbore. For example, changes in one or more sensed parameters may indicate one or more problems in the wellbore or environment. Alternatively, consistency or uniformity in sensed parameters may indicate no substantive problems in the wellbore or environment. Data (e.g., sealant parameters) from a plurality of monitoring intervals may be plotted over a period of time, and a resultant graph may be provided showing an operating or trend line for the sensed parameters, Atypical changes in the graph as indicated for example by a sharp change in slope or a step change on the graph may provide an indication of one or more present problems or the potential for a future problem. Accordingly, remedial and/or preventive treatments or services may be applied to address present or potential problems.

The MEMs may be used, for example, to monitor the integrity and performance of a set-delayed cement composition over its life. Performance may be indicated by changes, for example, in various parameters, including, but not limited to, moisture content, temperature, pH, and various ion concentrations (e.g., sodium, chloride, and potassium ions) of the set-delayed cement composition. The MEMS may be included in the set-delayed cement composition and parameters of the set-delayed cement composition may be monitored during placement and/or during the life of the set-delayed cement composition.

As previously mentioned, the set-delayed cement compositions may have a delayed set in that they remain in a pumpable fluid state for at least one day (e.g., at least about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some examples, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

Those of ordinary skill in the art will appreciate that the set-delayed cement compositions should have a density suitable for a particular application. By way of example, the set-delayed cement compositions may have a density in the range of from about 4 pounds per gallon ("lb/gal") to about 20 lb/gal. In certain examples, the set-delayed cement compositions may have a density in the range of from about 8 lb/gal to about 17 lb/gal. Examples of the set-delayed cement compositions may be foamed or unfoamed or may comprise other means to reduce their densities, such as hollow microspheres, low-density elastic beads, or other density-reducing additives known in the art. In examples, the density may be reduced after storing the composition, but prior to placement in a subterranean formation. Those of ordinary skill in the art, with the benefit of this disclosure, will recognize the appropriate density for a particular application. In some examples, the set-delayed cement compositions may set to have a desirable compressive strength after activation.

Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some examples, the set-delayed cement compositions may develop a compressive strength in 24 hours of at least about 50 psi, at least about 100 psi, at least about 500 psi, or more. In some examples, the compressive strength values may be determined using destructive or non-destructive methods at a temperature ranging from 100° F. to 200° F.

In some examples, the set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some examples, the set-delayed cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

As will be appreciated by those of ordinary skill in the art, the set-delayed cement compositions may be used in a variety of subterranean operations, including primary and remedial cementing. In some examples, a set-delayed cement composition may be provided that comprises water, pumice, hydrated lime, a set retarder, a MEMS, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Examples may further include activation of the set-delayed cement composition. The activation of the set-delayed cement composition may comprise, for example, the addition of a cement set activator to the set-delayed cement composition. Examples may further include using the MEMS to gather data and to monitor the integrity and performance of the set-delayed cement composition over its life.

In some examples, a set-delayed cement composition may be provided that comprises water, pumice, hydrated lime, a set retarder, a MEMS, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some examples, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein. Once introduce into the subterranean formation, the MEMS may be used to gather data and to monitor the integrity and performance of the set-delayed cement composition over its life.

In primary cementing, for example, the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing, a set-delayed cement composition may be used, for example, in squeeze-cementing operations or in the placement of cement plugs. The set-delayed composition may be placed in a wellbore to plug an opening (e.g., a void or crack) in the formation, in a gravel pack, in the conduit, in the cement sheath, and/or between the cement sheath and the conduit (e.g., a microannulus).

Further, the set-delayed cement compositions comprising MEMS may be used in surface cementing applications. In surface cementing applications, a cement set accelerator, for example, aluminum sulfate may be used to reduce the thickening time to a thickening time suitable for surface cementing applications. The MEMS sensor may monitor the integrity and performance of a set-delayed cement composition over its life. Performance may be indicated by changes, for example, in various parameters, including, but not limited to, moisture content, temperature, pH, and various ion concentrations (e.g., sodium, chloride, and potassium ions) of the set-delayed cement composition. Examples of surface applications may include, but should not be limited to home repair, foundation repair, roadway repair, construction, and the like.

A method of cementing may be provided. The method may be used in conjunction with one or more of the methods, compositions, and/or systems illustrated in FIGS. 1-3. The method may comprise providing a set-delayed cement composition comprising water, pumice, hydrated lime, a set retarder, and a micro-electrical-mechanical system; and allowing the set-delayed cement composition to set. The micro-electro-mechanical system may be about 5 mm$^2$ or smaller. The micro-electro-mechanical system may be present in the set-delayed cement composition in an amount of about 0.01 weight percent to about 25 weight percent. The micro-electro-mechanical system may be used to sense one or more parameters. The set retarder may comprise at least one retarder selected from the group consisting of a phosphate, a phosphonate, a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof. The set-delayed cement composition may further comprise a cement set activator selected from the group consisting of a zeolite, amine, silicate, Group IA hydroxide, Group IIA hydroxide, monovalent salt, divalent salt, nanosilica, polyphosphate, and any combination thereof. The set-delayed cement composition may further comprise a cement set activator comprising a combination of a monovalent salt and the polyphosphate. The set-delayed cement composition may further comprise a dispersant selected from the group consisting of a sulfonated-formaldehyde-based dispersant, a polycarboxylated ether dispersant, and any combination thereof. The set-delayed cement composition may be introduced into a subterranean formation. The set-delayed cement composition may be introduced into an annulus between a conduit disposed in a well bore and a wall of the well bore or another conduit. Prior to the allowing step, the set-delayed cement composition may be stored for a time period of about 7 days and then a cement set activator may be added to the set-delayed cement composition.

A composition may be provided. The composition may be used in conjunction with one or more of the methods, compositions, and/or systems illustrated in FIGS. 1-3. The composition may comprise water, pumice, hydrated lime, a set retarder, and a micro-electrical-mechanical system. The micro-electro-mechanical system may be about 5 mm$^2$ or smaller. The micro-electro-mechanical system may be present in the set-delayed cement composition in an amount of about 0.01 weight percent to about 25 weight percent. The set retarder may comprise at least one retarder selected from the group consisting of a phosphate, a phosphonate, a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof. The set-delayed cement composition may further comprise a cement set activator selected from the group consisting of a zeolite, amine, silicate, Group IA hydroxide, Group IIA hydroxide, monovalent salt, divalent salt, nanosilica, polyphosphate, and any combination thereof. The set-delayed cement composition may further comprise a cement set activator comprising a combination of a monovalent salt and the polyphosphate. The set-delayed cement composition may further comprise a dispersant selected from the group consisting of a sulfonated-formaldehyde-based dispersant, a polycarboxylated ether dispersant, and any combination thereof.

A system of cementing may be provided. The system may be used in conjunction with one or more of the methods, compositions, and/or systems illustrated in FIGS. 1-3. The system may comprise a cement composition comprising: water, pumice, hydrated lime, a set retarder; and a micro-electrical-mechanical system; a cement set activator; a vessel; and a pump. The micro-electro-mechanical system may be about 5 mm$^2$ or smaller. The micro-electro-mechanical system may be present in the set-delayed cement composition in an amount of about 0.01 weight percent to about 25 weight percent. The set retarder may comprise at least one retarder selected from the group consisting of a phosphate, a phosphonate, a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof. The set-delayed cement composition may further comprise a cement set activator selected from the group consisting of a zeolite, amine, silicate, Group IA hydroxide, Group IIA hydroxide, monovalent salt, divalent salt, nanosilica, polyphosphate, and any combination thereof. The set-delayed cement composition may further comprise a cement set activator comprising a combination of a monovalent salt and the polyphosphate. The set-delayed cement composition may further comprise a dispersant selected from the group consisting of a sulfonated-formaldehyde-based dispersant, a polycarboxylated ether dispersant, and any combination thereof.

Referring now to FIG. 1, the preparation of a set-delayed cement composition in accordance with example embodiments will now be described. FIG. 1 illustrates a system 2 for the preparation of a set-delayed cement composition and subsequent delivery of the composition to a wellbore in accordance with certain embodiments. As shown, the set-delayed cement composition may be mixed in a vessel 4. Vessel 4 may be any such vessel suitable for containing and/or mixing the set-delayed cement composition, including, but not limited to drums, barrels, tubs, bins, jet mixers, re-circulating mixers, batch mixers, and the like. The set-delayed cement composition may then be pumped via pumping equipment 6 to the wellbore. In some embodiments, the vessel 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and the activator may be added to the mixer as a powder prior to pumping the cement composition downhole. Additionally, batch mixer type units for the slurry may be plumbed in line with a separate tank containing a cement set activator. The cement set activator may then be fed in-line with the slurry as it is pumped out of the mixing unit. In some embodiments, the MEMS may be added to the vessel 4 containing the set-delayed cement composition and then mixed to uniformly distribute the MEMS within the set-delayed cement composition. The set-delayed cement composition may then be stored as desired with the MEMS disposed within. In alternative embodiments, the MEMS may be added to the set-delayed cement composition prior to deployment, i.e. pumping downhole.

Figure 2:
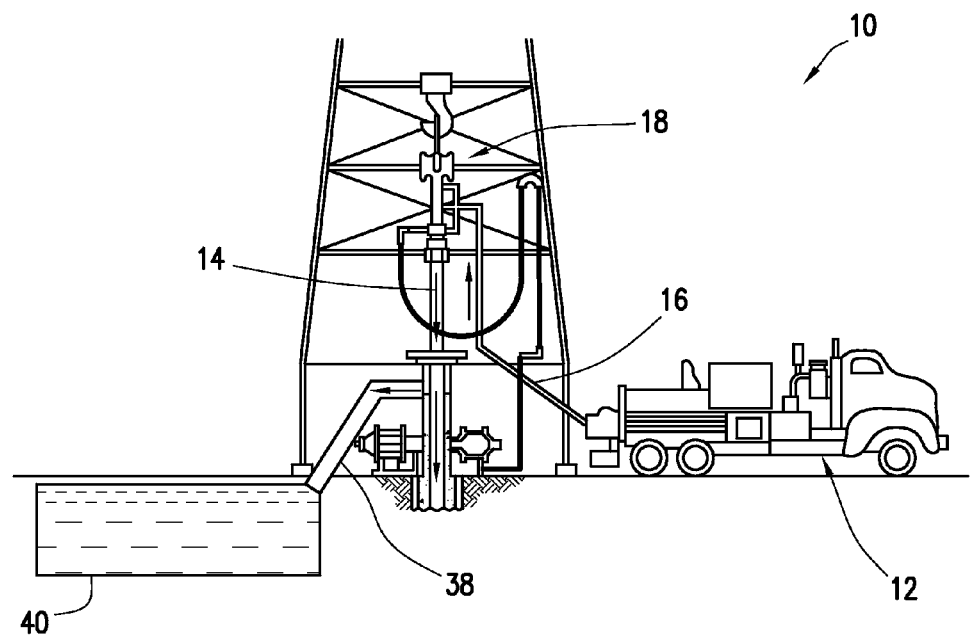
FIG. 2 illustrates surface equipment that may be used in the placement of a set-delayed cement composition in a wellbore in accordance with certain embodiments.

An example technique for placing a set-delayed cement composition comprising a MEMS into a subterranean formation will now be described with reference to FIGS. 2 and 3. The MEMS may be disposed in all or a portion of the set-delayed cement composition. FIG. 2 illustrates surface equipment 10 that may be used in placement of a set-delayed cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include vessel 4 and pumping equipment 6 (e.g., FIG. 1) as will be apparent to those of ordinary skill in the art. The cementing unit 12 may pump a set-delayed cement composition 14 through a feed pipe 16 and to a cementing head 18 which conveys the set-delayed cement composition 14 downhole.

Figure 3:
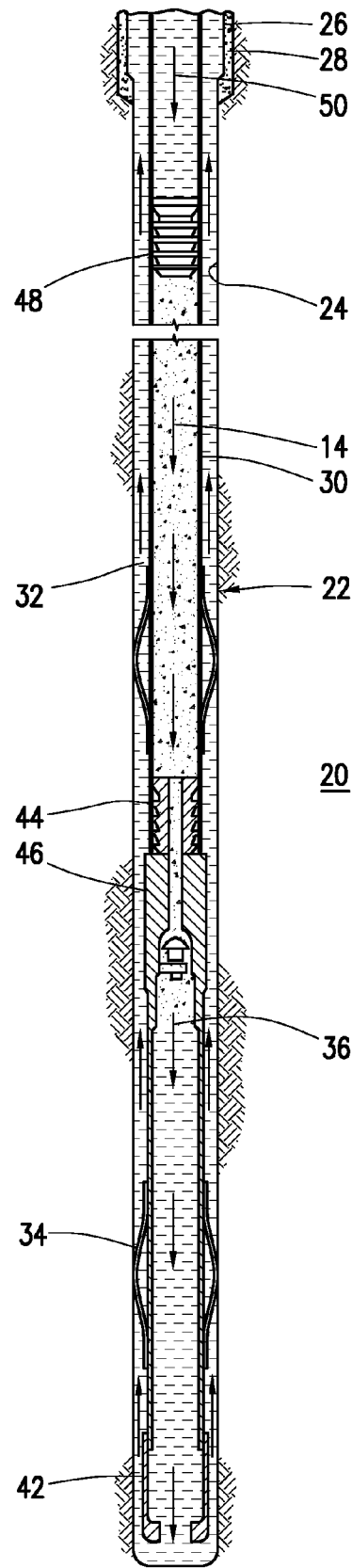
FIG. 3 illustrates the placement of a set-delayed cement composition into a wellbore annulus in accordance with certain embodiments.

Turning now to FIG. 3, the set-delayed cement composition 14 comprising a MEMS may be placed into a subterranean formation 20 in accordance with example embodiments. The MEMS may be disposed in all or a portion of the set-delayed cement composition. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the set-delayed cement composition 14 may be pumped down the interior of the casing 30. The set-delayed cement composition 14 may be allowed to flow down the interior of the casing 30 through the casing shoe 42 at the bottom of the casing 30 and up around the casing 30 into the wellbore annulus 32. The set-delayed cement composition 14 may be allowed to set in the wellbore annulus 32, for example, to form a cement sheath that supports and positions the casing 30 in the wellbore 22. While not illustrated, other techniques may also be utilized for introduction of the set-delayed cement composition 14. By way of example, reverse circulation techniques may be used that include introducing the set-delayed cement composition 14 into the subterranean formation 20 by way of the wellbore annulus 32 instead of through the casing 30.

As it is introduced, the set-delayed cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the set-delayed cement composition 14, for example, to separate the set-delayed cement composition 14 from the fluids 36 that may be inside the casing 30 prior to cementing. After the bottom plug 44 reaches the landing collar 46, a diaphragm or other suitable device should rupture to allow the set-delayed cement composition 14 through the bottom plug 44. In FIG. 3, the bottom plug 44 is shown on the landing collar 46. In the illustrated embodiment, a top plug 48 may be introduced into the wellbore 22 behind the set-delayed cement composition 14. The top plug 48 may separate the set-delayed cement composition 14 from a displacement fluid 50 and also push the set-delayed cement composition 14 through the bottom plug 44.

The MEMS sensor may monitor the integrity and performance of the set-delayed cement composition 14 over its life. Performance may be indicated by changes, for example, in various parameters, including, but not limited to, moisture content, temperature, pH, and various ion concentrations (e.g., sodium, chloride, and potassium ions) of the set-delayed cement composition 14.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of certain aspects of some embodiments are given. In no way should the following examples be read to limit, or define, the entire scope of the embodiments.

Example 1

The following series of tests was performed to evaluate the force resistance properties of comparative cement compositions comprising pumice and hydrated lime. Three different comparative sample settable compositions, designated Samples 1-3, were prepared using pumice (DS-325 lightweight aggregate), hydrated lime, Liquiment® 514L dispersant, and water, as indicated in the table below. After preparation, the samples were placed in an UCA and cured at 140° F. and 3,000 psi for 24 hours. The cured cement was then removed from the UCA and crushed to yield the compressive strength values provided in Table 1 below.

TABLE 1

| Compressive Strength Tests | | | | |
|---|---|---|---|---|
| Sample | | 1 | 2 | 3 |
| Density | lb/gal | 14.3 | 14.3 | 14.3 |
| Pumice:Lime Wt. Ratio | | 3:1 | 4:1 | 5:1 |
| Pumice | g | 400 | 400 | 400 |
| Lime | g | 134 | 103 | 100 |
| Dispersant | g | 12 | 4 | 13 |
| Water | g | 196 | 187 | 220 |
| 24-Hr Crush Strength | psi | 2,240 | 1,960 | 2,130 |

Example 1 thus indicates that cement compositions that comprise pumice and lime in a weight ratio ranging from 3:1 to 5:1 may develop compressive strengths suitable for particular applications.

Example 2

A sample set-delayed cement composition, designated Sample 4, having a density of 13.3 lb/gal was prepared that comprised 500 grams of pumice (DS-325 lightweight aggregate), 100 grams of hydrated lime, 13 grams of Liquiment® 514L dispersant, 24 grams of Micro Matrix® cement retarder, and 300 grams of water. The rheological properties of the sample were measured after storing at room temperature and pressure for periods of 1 day and 6 days. After preparation, the rheological properties of the sample were determined at room temperature (e.g., about 80° F.) using a Model 35A Fann Viscometer and a No. 2 spring, in accordance with the procedure set forth in API RP Practice 10B-2, *Recommended Practice for Testing Well Cements*. The results of this test are set forth in the table below.

TABLE 2

| Viscosity Tests | | | | | | | | |
|---|---|---|---|---|---|---|---|---|
| Age of Sample | Fann Readings | | | | | | Yield Point | Plastic Viscosity |
| (days) | 600 | 300 | 200 | 100 | 6 | 3 | (lb/100 ft$^{2)}$) | (centipoise) |
| 1 | 560 | 322 | 244 | 170 | 46 | 38 | 84 | 238 |
| 6 | 498 | 310 | 228 | 136 | 24 | 20 | 122 | 188 |

Example 2 thus indicates that set-delayed cement compositions that comprise pumice, hydrated lime, a dispersant, a set retarder, and water can remain fluid after 6 days.

Example 3

A sample set-delayed cement composition, designated Sample 5, having a density of 13.4 lb/gal was prepared that comprised 500 grams of pumice (DS-325 lightweight aggregate), 100 grams of hydrated lime, 7 grams of Liquiment® 514L dispersant, 6.3 grams of Micro Matrix® cement retarder, and 304 grams of water. The rheological properties of the sample were measured after storing at room temperature and pressure for periods of from 1 day to 19 days. The rheological properties were measured at room temperature (e.g., about 80° F.) using a Model 35A Fann Viscometer and a No. 2 spring, in accordance with the procedure set forth in API RP Practice 10B-2, *Recommended Practice for Testing Well Cements*. The results of this test are set forth in the table below.

TABLE 3

| Viscosity Tests | | | | | |
|---|---|---|---|---|---|
| Age of Sample | Fann Readings | | | | |
| (Days) | 300 | 200 | 100 | 6 | 3 |
| 1 | 462 | 300 | 130 | 12 | 8 |
| 2 | 458 | 282 | 122 | 6 | 4 |
| 5 | 420 | 260 | 106 | 3 | 2 |
| 8 | 446 | 270 | 110 | 4 | 1 |
| 12 | 420 | 252 | 100 | 3 | 2 |
| 19 | 426 | 248 | 94 | 2 | 1 |

After 7 days, calcium chloride in the amount indicated in Table 4 below was added to a separately prepared sample of the same formulation as above. The sample was then placed in an UCA and the initial setting time, which is the time for the composition to reach a compressive strength of 50 psi while maintained at 3,000 psi was determined in accordance with API RP Practice 10B-2, *Recommended Practice for Testing Well Cements*. The initial setting time of the sample was also determined without addition of the calcium chloride. The samples with and without the calcium chloride were heated to a temperature of 140° F. in 30 minutes and then maintained at that temperature throughout the test.

TABLE 4

| Compressive Strength Tests | | | |
|---|---|---|---|
| Age of Sample (Days) | Test Temperature (° F.) | CaCl$_2$ (% by wt of Pumice & Lime) | Initial Setting Time (hr:min) |
| 7 | 140 | 0 | no set after 4 days |
| 7 | 140 | 10 | 5:11 |

Example 3 thus indicates that the set-delayed cement compositions that comprise pumice, hydrated lime, a dispersant, a set retarder, and water will not set for a period of at least 19 days at ambient temperature and over 4 days at 140° F. Example 3 further indicates that sample set-delayed cement compositions may be activated at a desired time by addition of a suitable activator.

Example 4

A sample set-delayed cement composition, designated Sample 6, having a density of 13.4 lb/gal was prepared that comprised pumice (DS-325 lightweight aggregate), 20% hydrated lime, 1.4% Liquiment® 514L dispersant, 1.26% Micro Matrix® cement retarder, and 62% of water (all by weight of pumice, referred to in the table below as "% bwop"). After 45 days in storage at ambient conditions, the sample was mixed with 6% calcium chloride. At 140° F., the sample had a thickening time (time to 70 BC) of 2 hours and 36 minutes and an initial setting time (time to 50 psi) of 9 hours and 6 minutes as measured using an UCA while maintained at 3000 psi. After 48 hours, the sample was crushed with a mechanical press which gave a compressive strength of 2,240 psi. The thickening time and initial setting time were both determined in accordance with API RP Practice 10B-2, *Recommended Practice for Testing Well Cements*. The results of this test are set forth in the table below.

TABLE 5

Compressive Strength Tests

| Age of Sample (Days) | Test Temperature (° F.) | Calcium Chloride (% bwop) | Thickening Time (hr:min) | Initial Setting Time (hr:min) | 48 Hr Crush Strength (psi) |
|---|---|---|---|---|---|
| 45 | 140 | 6 | 2:36 | 9:36 | 2,240 |

Example 4 thus indicates that the set-delayed cement compositions that comprise pumice, hydrated lime, a dispersant, a set retarder, and water will not set for a period of at least 45 days at ambient temperature. Example 4 further indicates that sample set-delayed cement compositions may be activated at a desired time by addition of a suitable activator.

Example 5

This example was performed to evaluate the ability of sodium hydroxide and sodium sulfate to activate a set-delayed cement composition that comprised pumice (DS-325 lightweight aggregate), hydrated lime, Liquiment® 514L dispersant, Micro Matrix® cement retarder, and water. Four sample set-delayed cement compositions, designated Samples 7-10, were prepared having concentrations of components as indicated in the table below. The samples were monitored via an UCA. After the samples were placed in the UCA, the pressure was increased to 3,000 psi, and the temperature was increased to 100° F. over a 15-minute time period and held for the duration of the test. A portion of the slurry was retained and poured into a plastic cylinder to monitor the slurry behavior at room temperature and pressure. These procedures were repeated for all samples.

Sample 7 was monitored for 72 hours over which time no strength was developed and the slurry was still pourable when removed from the UCA. The portion kept at room temperature and pressure was likewise still pourable after 72 hours.

Sample 8 was prepared using the same slurry design as Sample 7 except that sodium hydroxide was added as an activator. The sodium hydroxide was added in solid form directly to the mixing jar that contained the prepared sample. As can be seen from Table 6, Sample 8, reached 50 psi of compressive strength at 16 hours and 36 minutes. The strength continued to build, reaching a maximum of 1,300 psi, when the test was stopped at 72 hours. The cured cement was removed from the UCA and crushed with a mechanical press which gave a compressive strength of 969 psi. The portion kept at room temperature and pressure was crushed after 7 days resulting in a compressive strength of 143 psi.

Sample 9 was prepared using the same slurry design as Sample 8 except that sodium sulfate was added as an activator. The sodium sulfate was added in solid form directly to the mixing jar that contained the prepared slurry. Sample 9 reached 50 psi of compressive strength at 67 hours and 29 minutes. The strength continued to build, slowly, reaching a maximum of 78 psi, when the test was stopped at 72 hours. The cured cement was removed from the UCA and crushed with a mechanical press which gave a compressive strength of 68.9 psi. The portion kept at room temperature and pressure was still too soft to be crushed after 7 days.

Sample 10 was prepared using the same slurry design as Sample 8 except that equal amounts of sodium hydroxide and sodium sulfate were added as an activator. The sodium hydroxide and sodium sulfate were added in solid form directly to the mixing jar that contained the prepared slurry. Sample 10 reached 50 psi of compressive strength at 22 hours and 40 minutes. The strength continued to build, reaching a maximum of 900 psi, when the test was stopped at 72 hours. The cured cement was removed from the UCA and crushed with a mechanical press which gave a compressive strength of 786 psi. The portion kept at room temperature and pressure was crushed after 7 days resulting in a compressive strength of 47.9 psi.

The results of these tests are set forth in the table below. The abbreviation "% bwop" refers to the percent of the component by weight of the pumice. The abbreviation "gal/sk" refers to gallons of the component per 46-pound sack of the pumice. The abbreviation "RTP" refers to room temperature and pressure.

TABLE 6

Compressive Strength Tests

| Sample | | 7 | 8 | 9 | 10 |
|---|---|---|---|---|---|
| Density | lb/gal | 13.38 | 13.38 | 13.38 | 13.38 |
| Water | % bwop | 61.97 | 63.60 | 64.62 | 64.11 |
| Pumice | % bwop | 100 | 100 | 100 | 100 |
| Hydrated Lime | % bwop | 20 | 20 | 20 | 20 |
| Dispersant | gal/sk | 0.07 | 0.07 | 0.07 | 0.07 |
| Set Retarder | % bwop | 0.06 | 0.06 | 0.06 | 0.06 |
| Sodium Hydroxide | % bwop | — | 4 | — | 2 |
| Sodium Sulfate | % bwop | — | — | 4 | 2 |
| UCA | | | | | |
| Temp/Press | F./Psi | 100/3000 | 100/3000 | 100/3000 | 100/3000 |
| Initial Set (50 psi) | hr:min | >78 | 16:36 | 67:29 | 22:40 |
| Final Set (100 psi) | hr:min | — | 21:08 | — | 32:44 |
| 24 Hr Comp. Strength | psi | — | 138.74 | — | 59.60 |
| 48 Hr Comp. Strength | psi | — | 711.35 | — | 331.48 |
| 72 Hr Comp. Strength | psi | — | 1300 | 78 | 900 |
| 72 Hr Crush Strength (UCA) | psi | — | 969 | 68.90 | 786 |
| 7-Day Crush Strength (RTP) | psi | — | 143.20 | 0.00 | 47.90 |

Example 5 thus indicates that sodium hydroxide, sodium sulfate, and combinations of the two can activate the set-delayed cement compositions, but to varying degrees. The testing showed that both sodium hydroxide and combinations of sodium hydroxide with sodium sulfate activated the cement compositions to an acceptable level. When compared to the non-activated composition, sodium sulfate activated the cement compositions, but much less so than the sodium hydroxide or combination of sodium hydroxide and sodium sulfate.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of cementing comprising:
preparing a set-delayed cement composition comprising water, cementitious components, a set retarder, a polycarboxylated ether dispersant, and a micro-electrical-mechanical system, wherein the cementitious components comprise pumice and hydrated lime without any additional components that hydraulically set in the presence of water; and
allowing the set-delayed cement composition to set.

2. The method of claim 1, wherein the micro-electro-mechanical system is about 5 mm$^2$ or smaller.

3. The method of claim 1, wherein the micro-electro-mechanical system is present in the set-delayed cement composition in an amount of about 0.01 weight percent to about 25 weight percent.

4. The method of claim 1, further comprising using the micro-electro-mechanical system to sense one or more parameters.

5. The method of claim 1 wherein the set retarder comprises at least one retarder selected from the group consisting of a phosphate, a phosphonate, a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

6. The method of claim 1 wherein the set-delayed cement composition further comprises a cement set activator selected from the group consisting of a zeolite, amine, silicate, Group IA hydroxide, Group IIA hydroxide, monovalent salt, divalent salt, nanosilica, polyphosphate, and any combination thereof.

7. The method of claim 1 wherein the set-delayed cement composition further comprises a cement set activator comprising a combination of a monovalent salt and the polyphosphate.

8. The method of claim 1 wherein the set retarder comprises a phosphonic acid derivative.

9. The method of claim 1 further comprising introducing the set-delayed cement composition into a subterranean formation.

10. The method of claim 9 wherein the set-delayed cement composition is introduced into an annulus between a conduit disposed in a well bore and a wall of the well bore or another conduit.

11. The method of claim 1 further comprising, prior to the allowing step, storing the set-delayed cement composition for a time period of about 7 days or longer and then adding a cement set activator to the set-delayed cement composition.

12. A method of cementing comprising:
preparing a set-delayed cement composition comprising water, a cementitious component comprising pumice and hydrated lime, a set retarder, a dispersant, a micro-electrical-mechanical system, an additional additive, wherein the additional additive is selected from the group consisting of a lightweight additive, a gas-generating additive, a mechanical property enhancing additive, a lost-circulation material, a defoaming agent, a foaming agent, a thixotropic additives, and any combination thereof, wherein the set-delayed cement composition is free of any additional cementitious components other than the pumice and the hydrated lime;
adding a cement set activator to the set-delayed cement composition to activate by the set-delayed cement composition; and
introducing the activated set-delayed cement composition into a subterranean formation.

13. The method of claim 12, wherein the micro-electro-mechanical system is about 5 mm$^2$ or smaller.

14. The method of claim 13, wherein the micro-electro-mechanical system is present in the set-delayed cement composition in an amount of about 0.01 weight percent to about 25 weight percent.

15. The method of claim 13, further comprising using the micro-electro-mechanical system to sense one or more parameters.

16. The method of claim 13, wherein the set retarder comprises at least one retarder selected from the group consisting of a phosphate, a phosphonate, a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

17. The method of claim 13, wherein the cement set activator comprises at least one cement set activator selected from the group consisting of a zeolite, amine, silicate, Group IA hydroxide, Group IIA hydroxide, monovalent salt, divalent salt, nanosilica, polyphosphate, and any combination thereof.

18. The method of claim 13, wherein the a cement set activator comprises a combination of a monovalent salt and the polyphosphate.

19. The method of claim 13, wherein the set retarder comprises a phosphonic acid derivative and the dispersant comprises a polycarboxylated ether dispersant.

20. The method of claim 13, wherein the activated set-delayed cement composition is introduced into an annulus between a conduit disposed in a well bore and a wall of the well bore or another conduit, and wherein the method further comprises, prior to the allowing step, storing the set-delayed cement composition for a time period of about 7 days or longer and then the step of adding the cement set activator to the set-delayed cement composition.

21. The method of claim 1, further comprising:
storing the set-delayed cement composition in a pumpable fluid state for a time period of about 1 day or longer;
reducing the density of the set-delayed cement composition; and
introducing the set-delayed cement composition into a subterranean formation,
wherein the storing the set-delayed cement composition occurs prior to the set-delayed cement composing being introduced into the subterranean formation, and
wherein the reducing the density occurs after the storing the set-delayed cement composition and before the introducing the set-delayed cement composition into the subterranean formation.

* * * * *